[12] United States Patent
Jang et al.

(10) Patent No.: US 11,952,968 B2
(45) Date of Patent: Apr. 9, 2024

(54) SAFETY IGNITION DEVICE FOR HIGH ALTITUDE DUAL PULSE MOTOR INCLUDING THE SAME

(71) Applicant: AGENCY FOR DEFENSE DEVELOPMENT, Daejeon (KR)

(72) Inventors: Seung Gyo Jang, Daejeon (KR); Doo Hee Han, Daejeon (KR); Young Hwa Kwon, Daejeon (KR)

(73) Assignee: AGENCY FOR DEFENSE DEVELOPMENT, Yuseong-gu Daejeon (KR)

(*) Notice: Subject to any disclaimer, the term of this patent is extended or adjusted under 35 U.S.C. 154(b) by 0 days.

(21) Appl. No.: 18/223,433

(22) Filed: Jul. 18, 2023

(65) Prior Publication Data
US 2024/0026840 A1 Jan. 25, 2024

(30) Foreign Application Priority Data
Jul. 21, 2022 (KR) .................. 10-2022-0090118

(51) Int. Cl.
*F02K 9/95* (2006.01)
*F02K 9/38* (2006.01)
*F42C 9/14* (2006.01)
*F42C 11/00* (2006.01)
*F42C 11/06* (2006.01)
*F42C 15/40* (2006.01)
*F42C 19/08* (2006.01)
*F42C 19/12* (2006.01)

(52) U.S. Cl.
CPC .................. *F02K 9/95* (2013.01); *F02K 9/38* (2013.01); *F42C 9/14* (2013.01); *F42C 11/00* (2013.01); *F42C 11/06* (2013.01); *F42C 15/40* (2013.01); *F42C 19/0819* (2013.01); *F42C 19/12* (2013.01)

(58) Field of Classification Search
CPC ........ F42C 19/12; F42C 19/0819; F42C 9/14; F42C 15/40; F42C 11/00; F42C 11/06; F02K 9/38; F02K 9/95
See application file for complete search history.

(56) References Cited

U.S. PATENT DOCUMENTS 4,999,997 A * 3/1991 Grosgebauer ....... F42C 19/0819
60/250
5,322,018 A * 6/1994 Hadden .................... F42B 3/04
102/284
5,600,946 A * 2/1997 Dombrowski .......... F02K 9/346
60/253

(Continued)

FOREIGN PATENT DOCUMENTS

KR 20000038951 A1 7/2000
KR 101063793 B1 9/2011

(Continued)

*Primary Examiner* — Kyle Robert Thomas
(74) *Attorney, Agent, or Firm* — NIXON PEABODY LLP

(57) ABSTRACT

The present invention relates a safety ignition device for a high altitude dual pulse motor according to the present invention, and can prevent accidental ignition of an ignition device or a propulsion engine while efficiently using a space by installing the safety ignition device in front of a combustion pipe, increase the reliability of ignition, and maintain the air tightness of the inside of the propulsion engine and the ignition device even in a high altitude environment.

7 Claims, 3 Drawing Sheets

(56) References Cited

U.S. PATENT DOCUMENTS

| | | | | |
|---|---|---|---|---|
| 8,397,486 | B2* | 3/2013 | Mihara | F02K 9/95 |
| | | | | 60/253 |
| 10,378,482 | B2* | 8/2019 | Hwang | F02K 9/95 |
| 2015/0308805 | A1* | 10/2015 | Van Vliet | F42C 19/12 |
| | | | | 102/202.14 |

FOREIGN PATENT DOCUMENTS

| KR | 101192203 B1 | 10/2012 |
|---|---|---|
| KR | 101494393 B1 | 2/2015 |
| KR | 101839193 B1 | 7/2017 |

* cited by examiner

SAFETY IGNITION DEVICE FOR HIGH ALTITUDE DUAL PULSE MOTOR INCLUDING THE SAME

CROSS-REFERENCE TO RELATED APPLICATIONS

This application claims priority under 35 U.S.C. § 119 to Korean Patent Application No. 10-2022-0090118, filed on Jul. 21, 2022, in the Korean Intellectual Property Office, the disclosure of which is incorporated herein by reference in its entirety.

TECHNICAL FIELD

The following disclosure relates to a safety ignition device for a high altitude dual pulse motor.

BACKGROUND

A dual pulse motor using a solid propellant is a rocket propulsion engine in the form in which two propellant grains are separated in one combustion tube by a thin diaphragm.

Generally, the combustion of a primary pulse propellant of the two propellants causes the rocket to fly toward the target, and the combustion of a secondary pulse propellant, which is combusted after a certain period of time, further accelerates the rocket. Compared to using a separate two-stage rocket, the dual pulse motor has excellent space utilization and may reduce manufacturing costs because it uses a single combustion tube and nozzle, and the like.

However, there is a difficulty in space design because igniters for igniting two pulse motors need to be separately installed in a single ignition device on a side surface of the ignition device for igniting the propellant. In particular, it is very difficult to apply a single ignition device to the safety ignition device to prevent accidental ignition of a dual pulse motor.

In order to solve this problem, conventionally, only an initiator was installed in the ignition device of the dual pulse motor, and the safety ignition device was installed in a separate space and adopted a structure in which the safety ignition device and the initiator are connected using an explosive transfer line.

In general, since the ignition device assembled in front of the rocket propulsion engine of the separated two-stage rocket utilizes an empty space (port) in front of each combustion tube, there is little difficulty in designing, manufacturing, and assembling.

In the case of the dual pulse motor, it is difficult to design a space because the ignition device for the primary pulse propellant and the secondary pulse propellant needs to be connected and installed in one housing in an empty space (port) in front of the combustion tube. In particular, when the primary pulse propellant is greatly separated from the front of the dual pulse motor, it is difficult to transfer energy generated from the igniter for the primary pulse propellant to the primary pulse propellant.

In addition, when the secondary pulse propellant is combusted after a certain period of time after the igniter for the primary pulse propellant operates, the igniter housing for the primary pulse propellant is exposed to the flow and heat caused by the combustion gas of the secondary propellant, so there is a risk of rupture. In this case, the igniter housing for the ruptured primary pulse propellant may scatter and adversely affect a nozzle heat-resistant material.

In order to solve this problem, in the prior art, the igniter housing is made of aluminum or an aluminum alloy so that the igniter housing melts when the primary pulse propellant is combusted. However, when the primary pulse propellant and the primary pulse igniter are separated from each other, it is not easy to melt the igniter housing and it is difficult to evenly melt the igniter housing.

Also, since the secondary pulse propellant in the dual pulse motor is located in front of the combustion tube and surrounded by a diaphragm to separate from the primary pulse propellant, it is difficult to secure an igniter installation space. Therefore, in the prior art, the igniter for the secondary pulse propellant is installed inside the igniter housing assembled in the port in front of the propulsion engine, and a passage is created between the ignition device and the secondary pulse propellant so that the igniter combustion gas is supplied to the secondary pulse propellant.

Because of the above problems, the prior art adopted the structure in which the safety ignition device is not installed in front of the combustion tube in the dual pulse motor, only the initiator, which is a part of the safety ignition device, is installed, the safety ignition device is installed at other locations, and then, the safety ignition device and the initiator are connected using the explosive transfer line.

In addition, in the case of a rocket propulsion engine launched at a high altitude, since a large air pressure difference between the inside and outside of the rocket propulsion engine occurs in a high altitude environment, there may be a problem in that air inside the rocket propulsion engine escapes to the outside, so the ignition performance of the ignition device may be lowered.

Therefore, it is necessary to design a safety ignition device that can solve the above problems.

RELATED ART DOCUMENT

[Patent Document]
US Patent Application Publication No. U.S. Pat. No. 5,675,966 A (Oct. 14, 1997)

SUMMARY

An embodiment of the present invention is directed to providing a safety ignition device for a high altitude dual pulse motor capable of preventing accidental ignition of an ignition device or a propulsion engine while efficiently utilizing a space through a compact design in which the safety ignition device, an initiator, an igniter, and the like may be connected through one housing, and maintaining air tightness inside the propulsion engine even in a high altitude environment.

In one general aspect, a safety ignition device includes: a housing that forms an accommodation space therein and is coupled to a front of a combustion tube; a primary circuit unit and a secondary circuit unit that are mounted inside the housing and generate an ignition signal to a primary propellant and a secondary propellant charged in the combustion tube, respectively; a secondary through bulkhead initiator that is mounted inside the housing and electrically connected to the secondary circuit unit; a secondary ignition unit that is located under the secondary through bulkhead initiator and connected to the secondary through bulkhead initiator through an ignition passage formed under the secondary through bulkhead initiator to ignite the secondary propellant; a primary ignition device that is mounted on one end of the housing, electrically connected to the primary circuit unit, and accommodated in the combustion tube; and a primary ignition unit that is mounted at a lower end of the primary ignition device and ignites the primary propellant.

DETAILED DESCRIPTION OF MAIN ELEMENTS

Figure 1:
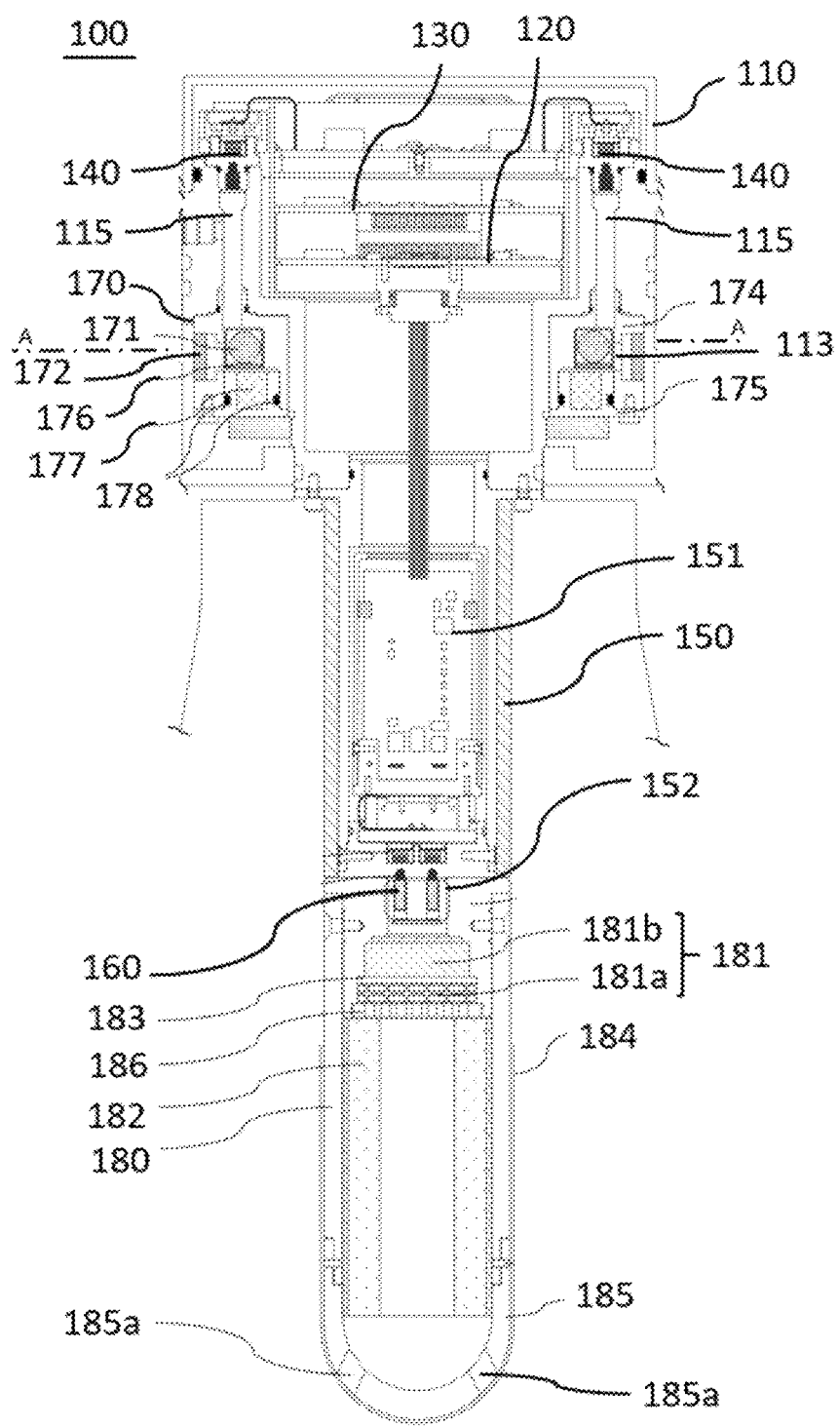
FIG. 1 is an enlarged side cross-sectional view of a safety ignition device according to an embodiment of the present invention.

100: Safety ignition device
110: Housing
113: Ignition passage
114: Barrier
115: Ignition passage
120: Primary circuit unit
130: Secondary circuit unit
140: Secondary through bulkhead initiator
150: Primary ignition device
151: Primary detonation unit
152: protrusion
152a: Thread
160: Primary through bulkhead initiator
170: Secondary ignition unit
171: Secondary ignition agent
172: Rupture disk
173: Auxiliary charge
174: First structure
175: Second structure
180: Primary ignition unit
181: Primary ignition agent
181a: Main ignition agent
181b: Auxiliary ignition agent
182: Propellant grain
183: Disk
184: Protective film
185: Cap
185a: Flame passage
186: Retainer
200: Propulsion engine
210: Combustion tube
211: Front port
212: Nozzle
213: Hollow part
300: Primary propellant
400: Secondary propellant
220: Diaphragm

DETAILED DESCRIPTION OF EMBODIMENTS

Embodiments of the present invention will be described with reference to the accompanying drawings in order to sufficiently understand the present invention. Embodiments of the present may be modified into several forms, and it is not to be interpreted that the scope of the present is limited to exemplary embodiments described in detail below. Embodiments are provided in order to completely explain the present to those skilled in the art. Therefore, shapes, or the like, of components in the accompanying drawings may be exaggerated for clarity. It is to be noted that the same members will be denoted by the same reference numerals throughout the accompanying drawings. In addition, a detailed description for the well-known functions and configurations that may unnecessarily make the gist of the present unclear will be omitted.

Hereinafter, embodiments of the present invention will be described with reference to the accompanying drawings.

Referring to FIG. 1, a safety ignition device 100 according to an embodiment of the present invention includes a housing 110, a primary circuit unit 120, a secondary circuit unit 130, a second through bulkhead initiator 140, a secondary ignition unit 170, a first ignition device 150, and a primary ignition unit 180.

The housing 110 is an exterior of the safety ignition device 100 and forms an accommodation space therein, so the primary circuit unit 120, the secondary circuit unit 130, the secondary through bulkhead initiator 140, and the secondary ignition unit 170, and the like may be mounted in the accommodation space.

Figure 2:
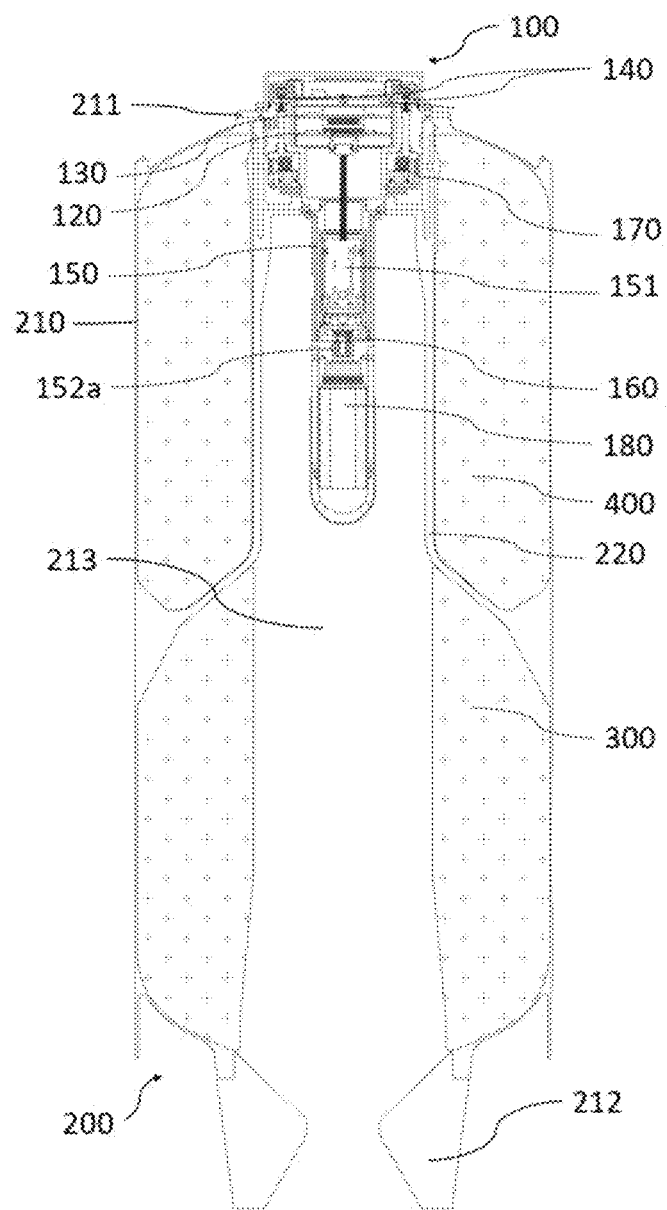
FIG. 2 is a side cross-sectional view of a propulsion engine according to an embodiment of the present invention.
Figure 3:
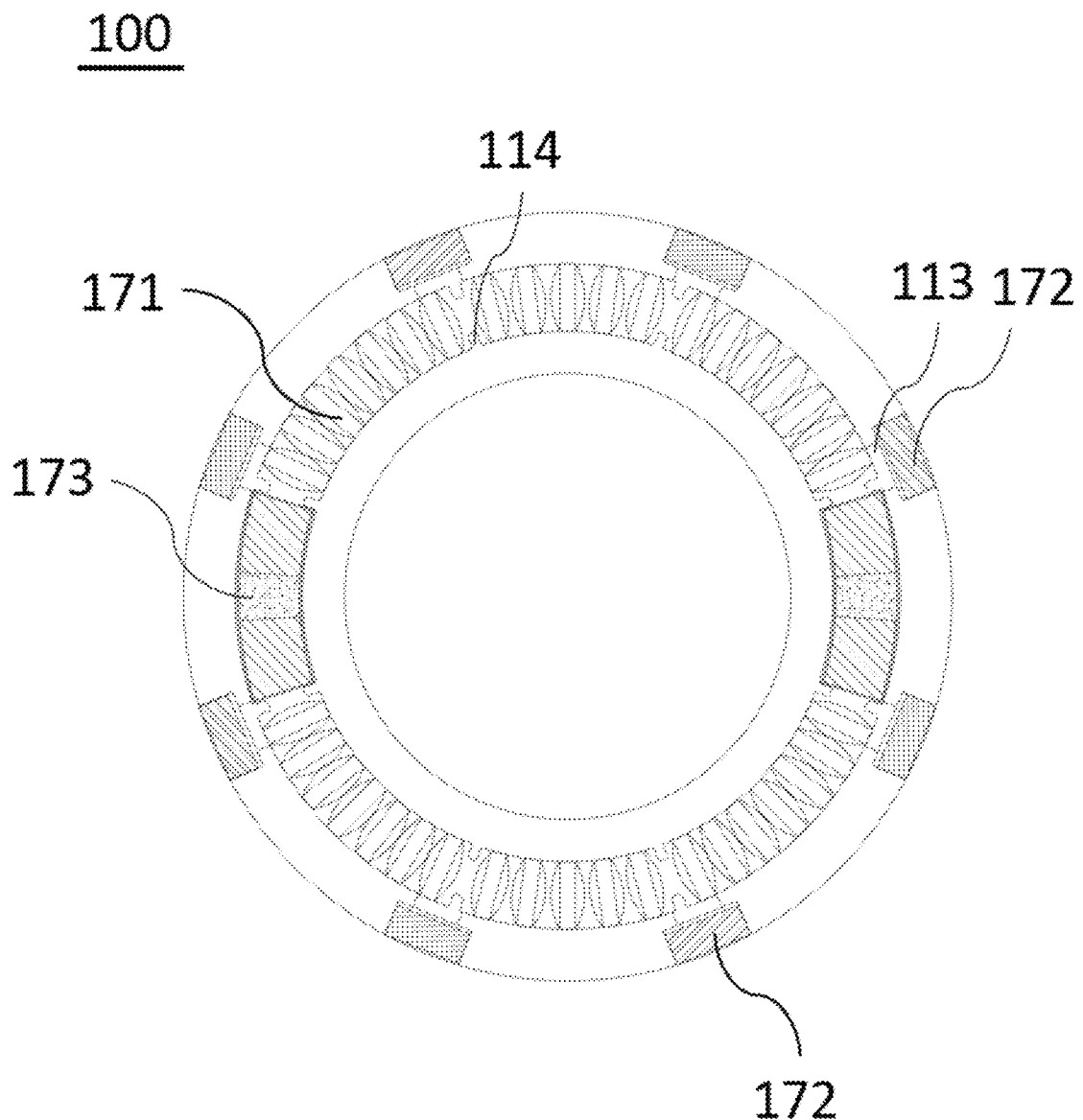
FIG. 3 is a front cross-sectional view of AA from FIG. 1.

The housing 110 may be formed in a circular shape when viewed from a plane as illustrated in FIG. 3 and may be coupled to the front of the combustion tube 210 as illustrated in FIG. 2. A front port 211 may be formed in front of the combustion tube 210, and the housing 110 may be fastened to the front port 211.

The primary circuit unit 120 for generating an ignition signal to the primary propellant 300 and the secondary circuit unit 130 for generating an ignition signal to the secondary propellant 400 may be mounted inside the accommodation space of the housing 110.

The primary circuit unit 120 and the secondary circuit unit 130 may be composed of Printed Circuit Boards (PCBs) composed of electronic circuits.

The primary circuit unit 120 and the secondary circuit unit 130 are co-located in one housing 110 so that the safety ignition device 100 may be designed to increase space efficiency and to be compact.

Referring to FIG. 1, the primary circuit unit 120 and the secondary circuit unit 130 may be stacked and disposed inside the housing 110, the secondary circuit unit 130 may be disposed at an upper portion, and the primary circuit unit 120 may be disposed and mounted at a lower portion.

The secondary through bulkhead initiator 140 may be mounted and provided inside the housing 110 so as to be electrically connected to the secondary circuit unit 130. The two secondary through bulkhead initiators 140 may be disposed spaced apart from each other in a circumferential direction. That is, each of the two secondary through bulkhead initiators 140 may be disposed to be close to an inner circumference of the housing 110, but may be spaced apart from each other and mounted to be located at circumferential ends.

The housing 110 is coupled to penetrate through the front of the combustion tube 210, and one end of the housing 110 is accommodated inside the combustion tube 210. The front of the combustion tube 210 is penetrated to communicate with the inside of the combustion tube 210. The front of the combustion tube 210 penetrated is blocked while the housing 110 is coupled. In addition, the front of the combustion tube 210 may form the front port 211, and in this case, the housing 110 may be coupled to the front of the combustion tube 210 while being coupled to the front port 211.

One end of the housing 110 is accommodated inside, and the first ignition device 150 electrically connected to the primary circuit unit 120 may be mounted on one end of the housing 110.

The first ignition device 150 receives the ignition signal from the primary circuit unit 120 and ignites the primary propellant 300 charged inside the combustion tube 210.

Referring back to FIG. 1, the first ignition device 150 has a cylindrical shape and is mounted on one end of the housing 110 of the safety ignition device 100. The inside of the first ignition device 150 includes a primary detonation unit 151 electrically connected to the primary circuit unit 120.

The first detonation unit 151 receives the ignition signal of the primary circuit unit 120 and transfers the received ignition signal to the primary through bulkhead initiator 160 to be described later. The first detonation unit 151 may be composed of an electronic circuit card in the form of a PCB. The two primary detonation units 151 may be disposed to face each other in the longitudinal direction of the first ignition device 150.

A protrusion 152 may be formed at the end of the primary ignition device 150, and the primary through bulkhead initiator 160 electrically connected to the primary detonation unit 151 may be provided in the protrusion 152.

The primary through bulkhead initiator 160 may be arranged side by side with a predetermined gap inside the protrusion 152.

The primary detonation unit 151 and the primary through bulkhead initiator 160, respectively, are composed of two, and are connected to each other in a one-to-one correspondence. By configuring the two primary detonation units 151 and the two primary through bulkhead initiators 160 each, even if a problem occurs in one side during the ignition process, an ignition signal is transmitted from the other side so that the first propellant 300 may be ignited.

Therefore, by configuring the primary circuit unit 120, the primary detonation unit 151, and the primary through bulkhead initiator 160 together in a space close to each other, it is possible to increase the utilization of space and compactly design the safety ignition device 100 itself. In addition, ignition reliability of the first propellant 300 may be increased by configuring the two primary detonation units 151 and the two primary through bulkhead initiators 160, respectively.

A primary ignition unit 180 ignited by the primary through bulkhead initiator 160 may be fastened to the protrusion 152 of the primary ignition device 150. A thread 152a, which is a male screw, is formed on an outer side surface of the protrusion 152 and a female screw thread is formed on the primary ignition unit 180, so the protrusion 152 and the primary ignition unit 180 may be interlocked and fastened to each other.

The primary ignition unit 180 has a cylindrical cylinder shape and may be formed of a Fiber Reinforced Plastics (FRP) material.

The primary ignition unit 180 may include a primary ignition agent 181 and a propellant grain 182.

The primary ignition agent 181 may be composed of a main ignition agent 181a and an auxiliary ignition agent 181b. The auxiliary ignition agent 181b is provided in the direction of the primary through bulkhead initiator 160, and the auxiliary ignition agent 181b may be configured to have a main ignition agent 181a on the lower side thereof.

A disk 183 made of styrene foam was disposed between the main ignition agent 181a and the auxiliary ignition agent 181b to prevent the two ignition agents from mixing with each other. A $BKNO_3$ granule may be used as the auxiliary ignition agent 181b, and magnesium Teflon Viton (MTV) granules may be used as the main ignition agent 181a.

A cartridge-type propellant grain 182 may be filled under the main ignition agent 181a. The propellant grain 182 may be fixed to an inner side surface of the primary ignition unit 180 using epoxy. When the auxiliary ignition agent 181b and the main ignition agent 181a operate in order to ignite the primary propellant 300, the propellant grain 182 instantaneously release large ignition energy. This may secure ignition reliability in a vacuum condition, which is a high altitude environment, and complete combustion within about 0.2 seconds.

The main ignition agent 181a may be configured in a fillet shape, and a retainer 186 made of metal material may be installed between the main ignition agent 181a and the propellant grains 182 so that the fillet-shaped main ignition agent 181a does not scatter when the main ignition agent 181a operates.

The primary ignition unit 180 is accommodated in the hollow part 213 inside the combustion tube 210. The outer side surface of the primary ignition unit 180 is exposed to the outside and is affected by moisture, and may be affected by vacuum caused by the high altitude environment during operation. To prevent this, the outer side surface of the primary ignition unit 180 is surrounded by a protective film 184. The protective film 184 may be made of a PVC material. The outer side surface of the primary ignition unit 180 may be protected from external influences through the protective film 184.

The primary ignition unit 180 may have a hemispherical cap 185 at a lower end thereof, and a plurality of flame passages 185a may be formed downward in the cap 185. The flame passages 185a may be radially formed at a predetermined angle to each other.

When the cap 185 and the flame passage 185a generate a flame by the operation of the primary ignition agent 181 and the propellant grain 182 to ignite the primary propellant 300, the cap 185 and the flame passage 185a may concentrate ignition energy on the primary propellant 300 while minimizing the effect of the ignition flame on the adjacent diaphragm 220.

The secondary ignition unit 170 is located under the secondary through bulkhead initiator 140 and is connected to the secondary ignition unit 170 through the ignition passage 115 formed under the secondary through bulkhead initiator 140 to ignite the secondary propellant 400.

The ignition passage 115 is formed in the longitudinal direction of the housing 110 and connects the secondary through bulkhead initiator 140 and the secondary ignition unit 170 to communicate with each other. The secondary ignition unit 170 operates by the secondary through bulkhead initiator 140, and the secondary ignition unit 170 ignites the secondary ignition agent 400.

The secondary ignition unit 170 is formed in an annular shape around the inner circumference of the housing 110 and accommodates the secondary ignition agent 171 therein. An ignition passage 113 is formed on the side surface of the housing 110 so that the secondary ignition unit 170 and the secondary propellant 400 communicate with each other.

The secondary ignition unit 170 may include a first structure 174 and a second structure 175. Both the first structure 174 and the second structure 175 are configured in an annular shape, the first structure 174 may be connected to the ignition passage 115, and a second structure 175 may be positioned at the lower end of the first structure 174.

The first structure 174 may accommodate the secondary ignition agent 171 therein. Referring to FIG. 3 as well, the first structure 174 forms a protruding barrier 114 with a predetermined gap on an inner wall. The secondary ignition agent 171 may be composed of pill-shaped pellets of $BKNO_3$ as a main charge, and may be arranged radially by dividing the barrier 114. The secondary ignition agent 171 may be fixed using a styrene foam 176 formed on a bottom surface of the first structure 174.

In addition, an auxiliary charge 173 in the form of granules of BKNO₃ may be contained in a synthetic resin case and disposed in contact with the end of the ignition passage 115 in the secondary ignition unit 170. Two ignition passages 115 may be formed to face each other in the circumferential direction of the secondary ignition unit 170, and two auxiliary charges 173 may be formed corresponding thereto.

An ignition passage 113 may be formed on the side surface of the housing 110, and the ignition passage 113 may communicate with the first structure 174. The ignition passage 113 may be formed outside the first structure 174. Referring to FIG. 3, a plurality of ignition passages 113 may be formed in the circumferential direction.

In addition, the ignition passage 113 may be provided with a rupture disk 172 that is ruptured when the secondary ignition agent 171 is ignited while sealing the inside of the secondary ignition unit 170. The rupture disk 172 is to secure the air tightness of the secondary ignition unit 170 in a high altitude environment and may be provided at the end of the ignition passage 113. The rupture disk 172 may be formed by configuring a cross-shaped notch in a thin metal plate so as to be ruptured at a certain pressure.

The second structure 175 may be filled with a propellant 177 made of HTPB to improve ignition in a vacuum, and may be combusted simultaneously with the secondary ignition agent 171. The combustion flame of the propellant 177 is injected to the secondary propellant 400 through the ignition passage 113 together with the secondary ignition agent 171.

The first structure 174 and the second structure 175 may be engaged with each other and then fixed with a screw, and the air tightness may be maintained with two O-rings 178.

This configuration may allow the secondary through bulkhead initiator 140 to effectively ignite the secondary ignition unit 170, and even if ignition failure occurs in one secondary through bulkhead initiator 140, increase the reliability of ignition by igniting the secondary ignition unit 170 using another secondary through bulkhead initiator 140.

Referring to FIG. 2 as well, the housing 110 may form a flange on an outer circumference and may be coupled to the front of the combustion tube 210 by the flange. The housing 110 may be coupled to a flange with a protruding outer circumference using a fastening member such as a bolt.

In addition, the front of the combustion tube 210 forms a penetrating part connected to the hollow part 213 inside the combustion tube 210. In addition, one end of the housing 110 may be inserted into and coupled to the penetration part. In addition, the O-ring for sealing the inside of the combustion tube 210 may be installed at a portion where the penetration part and the housing 110 come into contact while being coupled.

Referring to FIG. 2, the propulsion engine 200 according to an embodiment of the present invention may be configured to include a combustion tube 210, a primary propellant 300, a secondary propellant 400, a diaphragm 220, and the safety ignition device 100 described above.

The combustion tube 210 forms a nozzle 212 at the rear and a hollow part 213 extending from the front to the nozzle 212 therein. Alternatively, the combustion tube 210 may form the front port 211 at the front, a nozzle 212 at the rear, and the hollow part 213 connected to the nozzle 212 therein.

The combustion tube 210 forms the hollow part 213 through which the inside extends from the front to the nozzle 212, and the safety ignition device 100 is coupled to the front to block the combustion tube 210.

The primary propellant 300 and the secondary propellant 400 are charged inside the combustion tube 210, and are charged around the inner side wall of the combustion tube 210 while surrounding the hollow part 213. In addition, the primary propellant 300 and the secondary propellant 400 are charged to be distinguished from each other, and are separated from each other by the diaphragm 220.

Upon the ignition, the primary propellant 300 is ignited first, and the secondary propellant 400 is ignited with a time difference. The secondary propellant 400 is wrapped by the diaphragm 220 so that it may withstand heat and pressure generated as the primary propellant 300 is combusted for a predetermined time and may be ruptured when the secondary propellant 400 is ignited.

The secondary propellant 400 is surrounded by the inner side wall of the combustion tube 210 and the diaphragm 220 and is separated from the primary propellant 300.

Since the primary propellant 300 is combusted first, the primary propellant 300 is charged on the nozzle 212 side and the secondary propellant 400 is charged on the front side.

The safety ignition device 100 is mounted in front of the combustion tube 210 and may sequentially ignite the primary propellant 300 and the secondary propellant 400 at predetermined time intervals.

When the safety ignition device 100 is coupled to the combustion tube 210, the primary ignition unit 180 of the safety ignition device 100 is located in the hollow part 213 inside the combustion tube 210. The primary ignition unit 180 is formed long in the longitudinal direction of the combustion tube 210 so as to be close to the primary propellant 300.

The primary circuit unit 120 operates normally only when a rated charging signal and ignition signal are sequentially applied. The control unit of the primary circuit unit 120 checks whether the charging signal is normal or not, transmits a charging command to a charging unit, and charges a built-in high voltage capacitor. Subsequently, when an ignition signal is applied at regular time intervals, the primary through bulkhead initiator 160 connected to the high voltage capacitor is operated by quickly discharging the charge charged in the high voltage capacitor.

The secondary circuit unit 130 has the same function as the primary circuit unit 120. The secondary propellant 400 needs to operate after the primary propellant 300 is combusted. The control unit of the secondary circuit unit 130 may monitor the ignition signal transmitted to the primary propellant 300 to prevent the accidental ignition of the secondary propellant 400 and use the monitored ignition signal as a charging condition. To this end, a microcontroller unit (MCU) is installed in a control unit of the primary circuit unit 120 and the secondary circuit unit 130, and an input/output signal may be controlled using a driving program.

In addition, a rocket capable of adjusting the ignition timing of the primary propellant 300 and the secondary propellant 400 by configuring the propulsion engine 200 having the safety ignition device 100 described above may be proposed.

According to a safety ignition device for a high altitude dual pulse motor according to the present invention, it is possible to prevent accidental ignition of an ignition device or a propulsion engine while efficiently using a space by installing the safety ignition device in front of a combustion tube, increase the reliability of ignition, and preventing the degradation in performance of the ignition device while maintaining the air tightness inside the propulsion engine even in a high altitude environment.

The embodiments of the present invention described above are merely exemplary, and those skilled in the art will appreciate that various modifications and equivalent other embodiments are possible therefrom. It may be understood well that the present invention is not limited to only a form mentioned in the above detailed description. Accordingly, an actual technical scope of the present invention is to be defined by a technical spirit of the following claims. In addition, it is to be understood that the present invention includes all modifications, equivalents, and substitutes that fall in the spirit and scope of the present invention defined by the claims.

What is claimed is:

1. A safety ignition device, comprising:
   a housing that forms an accommodation space therein and is coupled to a front of a combustion tube;
   a primary circuit unit and a secondary circuit unit that are mounted inside the housing and generate an ignition signal to a primary propellant and a secondary propellant charged in the combustion tube, respectively;
   two primary through bulkhead initiators and two secondary through bulkhead initiators that are mounted inside the housing and electrically connected to the primary and secondary circuit unit, respectively;
   wherein the two secondary through bulkhead initiators are spaced apart from each other in a circumferential direction;
   a secondary ignition unit that is located under the secondary through bulkhead initiators and connected to the secondary through bulkhead initiators through an ignition passage formed under the secondary through bulkhead initiators to ignite the secondary propellant;
   a primary ignition device that is mounted on one end of the housing, electrically connected to the primary circuit unit, and accommodated in the combustion tube; and a primary ignition unit that is mounted at a lower end of the primary ignition device and ignites a primary propellant;
   wherein the primary ignition device has a primary detonation unit electrically connected to the primary circuit unit therein, and the primary through bulkhead initiator that is electrically connected to the primary detonation unit at a protrusion protruding from an end thereof;
   wherein the primary ignition unit accommodates a primary ignition agent ignited by the primary through bulkhead initiator therein and is fastened to the protrusion; and
   a hemispherical cap on a lower end of the primary ignition unit, the hemispherical cap having a plurality of flame passages formed downwardly.

2. The safety ignition device of claim 1, wherein the primary circuit unit and the secondary circuit unit are stacked and mounted so that the secondary circuit unit is disposed on an upper portion and the primary circuit unit is disposed on a lower portion.

3. The safety ignition device of claim 1, wherein the two primary through bulkhead initiators are arranged side by side with a predetermined gap inside the protrusion.

4. The safety ignition device of claim 1, wherein the secondary ignition unit is formed in an annular shape around an inner circumference of the housing to accommodate a secondary ignition agent therein, and a plurality of ignition passages is formed on a side surface of the housing so that the secondary ignition unit and the secondary propellant communicate with each other.

5. The safety ignition device of claim 4, wherein the plurality of ignition passages are formed in a circumferential direction on the side surface of the housing, and include a rupture disk that is ruptured when the second ignition agent is ignited while sealing the inside of the second ignition unit.

6. The safety ignition device of claim 1, wherein an outer side surface of the primary ignition unit is surrounded by a protective film.

7. The safety ignition device of claim 1, wherein the plurality of flame passages are formed radially with a predetermined angle from each other.

* * * * *